METHOD AND APPARATUS FOR CUTTING A GROOVE IN THE SURFACE OF AN ORIGINAL RECORDING DISC

Filed Dec. 19, 1967 2 Sheets-Sheet 1

Inventor:
Horst Redlich

BY Spencer & Kaye
Attorneys

Inventor:
Horst Redlich
BY Spencer & Kaye
Attorneys

United States Patent Office 3,528,665

Patented Sept. 15, 1970

3,528,665
METHOD AND APPARATUS FOR CUTTING A GROOVE IN THE SURFACE OF AN ORIGINAL RECORDING DISC

Horst Redlich, Berlin, Germany, assignor to Teldec, Telefunken-Decca Schallplatten G.m.b.H., Hamburg, Germany Filed Dec. 19, 1967, Ser. No. 691,874
Claims priority, application Germany, Dec. 22, 1966, R 44,880
Int. Cl. G11b; B23p *13/04*
U.S. Cl. 274—46 7 Claims

ABSTRACT OF THE DISCLOSURE

A method for cutting a constant pitch spiral groove into the surface of a recording disc so as to eliminate variations in the groove dimensions as a result of irregularities in the surface of the disc, by cutting such groove, with the aid of a stylus having a triangular cross section, to a sufficient depth such that none of the original surface of the disc remains between adjacent turns of the spiral groove.

BACKGROUND OF THE INVENTION

The present invention relates to a method and apparatus for cutting a spiral groove, having a preferably constant pitch, into the surface of an original recording disc, generally referred to in the art as an "original."

In the cutting of such originals, difficulties often arise due to the fact that their surface is not perfectly flat, i.e., planar. According to current cutting techniques, the cutter or stylus cartridge is mounted to have a certain freedom of vertical movement and the bearing, or cutting, force applied to the tip of the stylus will determine the unmodulated depth of the resulting groove. Any unevenness of the surface of the original will thus lead to the production of grooves whose depth or width varies by a substantial amount in comparison with the small dimensions of the grooves. The influence of these variations increases as the desired groove depth and width become smaller and as the spacing between adjacent grooves on the disc surface is decreased. For example, at the presently desired groove density of up to 100 grooves per millimeter of surface width, the influence of these variations is particularly noticeable.

Regulating techniques are also known in which the position of the cutting tip stylus can be adjusted with reference to the surface of the original recording in order to attain a constant groove depth. However, arrangements for achieving this result do not operate with sufficiently low inertia due to the large mass of the cutting system. Although such techniques can reduce the variations in the depth of the grooves, their effect is not sufficient for very small groove depths or in those cases where very high accuracy is required.

SUMMARY OF THE INVENTION

It is a primary object of the present invention to eliminate these drawbacks and difficulties.

A more specific object of the present invention is to eliminate variations in the depth and width of the grooves cut in an original disc having an irregular surface.

Still another object of the present invention is to eliminate the influence of surface irregularities on the dimensions of the resulting grooves.

These and other objects according to the present invention are achieved by a novel method for cutting a spiral groove into the surface of a recording disc, which surface is not perfectly planar, by means of a cutting stylus having a triangular cross section defining two cutting edges forming betwen them an angle $\beta$ of predetermined magnitude. The method according to the present invention is carried out by rotating the disc relative to the stylus while applying to the stylus a sufficiently great cutting force to cause it to cut a groove whose average depth is such that none of the original surface of the disc will remain between adjacent turns of the spiral groove.

The objects according to the present invention are also achieved by the provision of a novel arrangement for cutting a spiral groove in the surface of a recording disc, which surface is not perfectly planar. The arrangement according to the present invention includes a first cutting stylus carried by a cutter and having a triangular profile for cutting the groove to a sufficient depth such that none of the original surface of the disc will remain between adjacent turns of the groove, thereby leaving an upwardly projecting, sharp crest between groove turns. The arrangement further includes a second stylus associated with the first cutting stylus for moving vertically with the cutter and having a flat cutting edge substantially parallel to the bottoms of the groove turns for cutting off the tops of such crests, the second stylus being positioned, relative to the first stylus, so that its flat cutting edge is centered with respect to the sharp crest between two adjacent groove turns previously cut by the first stylus.

DESCRIPTION OF THE PREFERRED EMBODIMENTS

Figure 1:
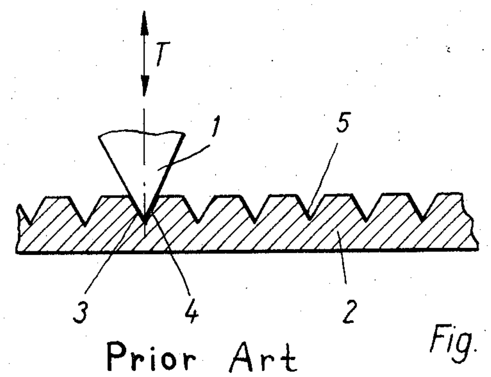
Prior Art Fig. 1
FIG. 1 is a schematic, cross-sectional, detail view illustrating the groove-cutting technique according to the prior art.

In FIG. 1, the tip (shown to an enlarged scale) of a cutting stylus 1 is mounted in a cutting cartridge (not shown), or cutter, which cartridge is mounted on a rod assembly which permits it and the cutting stylus 1 a certain amount of vertical movement in the direction of the double arrow T. The bearing force applied to the tip of the stylus 1 determines the depth, from the disc surface, of the groove 5 being cut into the surface of the disc 2. The width of the groove is dependent on the bearing force and on the angle between the cutting edges 3 and 4 of the stylus tip. The pitch of the spiral groove is selected, in a known manner, so that sufficiently wide bridges, defined by the remaining portions of the original disc surfaces, are provided between adjacent grooves 5 to support the tracking forces of the playback stylus.

The disadvantage of this known method is that the cutting implement, in spite of its mobility in the direction of the arrow T, can not, due to its large mass, follow the unevennesses of the disc surface rapidly enough to prevent the grooves 5 from being cut to irregular depths.

Figure 2:
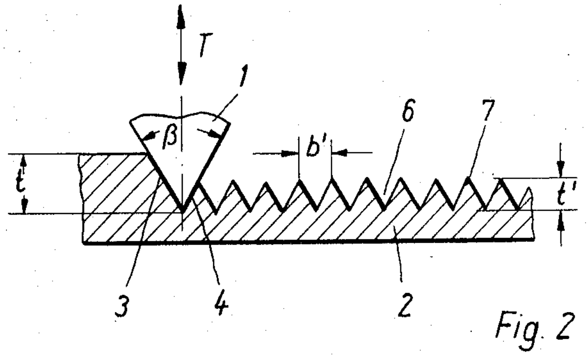
FIG. 2 is a view similar to that of FIG. 1 illustrating the groove-cutting technique according to the present invention.

FIG. 2 shows the manner in which the method according to the present invention overcomes this drawback. Corresponding parts are given the same reference numbers in FIGS. 2 and 3 as in FIG. 1. In FIG. 2 the average cutting depth $t$ of the cutting stylus 1 into the recording disc 2 is determined, by appropriate selection of the cutting, or bearing, force so that, taking into consideration the angle $\beta$ between the cutting edges 3 and 4 of the stylus 1, no portions of the original surface of the recording disc 2 remain in the regions 7 between two adjacent grooves 6.

It may be noted that with such a dimensioning of the cutting depth, the effective, or operative, length of the cutting edge 3 has been increased in comparison with the corresponding effective length of the cutting edge 4. The cutting depth $t$ is thus selected so that the cutting of one groove will involve the removal of surface portions above the region to be occupied by the next succeeding groove. Thus, grooves 6 are created with regions 7 therebetween defining sharp edges extending upwardly toward the record surface.

In the practice of the method according to the present invention, the radially innermost edge 3 of stylus 1 removes material to a depth $t$ in a manner similar to the known process of turning. However, contrary to the turning method, the cutting depth is here a constant value determined by the bearing, or cutting, force so that the imaginary center lines at the bottoms of grooves 6 represent a reproduction, transferred onto a lower plane, of the original uneven surface of the disc 2. The resulting grooves will nevertheless all have substantially the same profile, as will be explained below with reference to FIGS. 4 and 5, due to the fact that this depth-cutting method makes it possible for the grooves, even if their bottoms are at different surface levels, to always extend to the line of intersection of the adjacent sides of two grooves.

In FIG. 2 the resulting width of each groove is $b'$ and the resulting groove depth $t'$.

Figure 3:
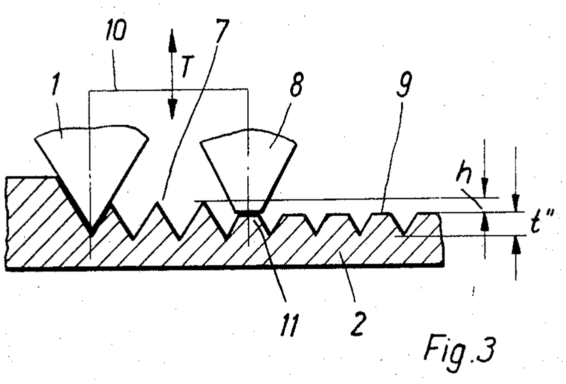
FIG. 3 is a view similar to that of FIG. 1 illustrating a further feature of the groove-cutting technique according to the present invention.

It might be desired to flatten the knife-edge portions 7 shown in FIG. 2 in order to prevent the subsequent breaking off of such portions. FIG. 3 shows how, according to another feature of the present invention, the tip of each portion 7, which is formed as a knife-edge after a groove has been cut, is cut away by a second cutting stylus 8 having a flat cutting edge 11 which is parallel to the plane containing the center axes of the two grooves adjacent to the portion 7. The height $h$ of the portion which is to be cut away is selected so that the remaining groove depth $t''$ will be of the desired size.

In one arrangement for carrying out this method, the second cutting stylus 8 can be connected to the guide rod assembly 10 which also supports the cutting head carrying the groove-cutting stylus 1 in such a manner that the center of its cutting edge 11 coincides with the center of a portion 7 to be flattened and that it follows the preceding cutting stylus 1 at an appropriate distance.

In applying the method according to the present invention, the deflection of the stylus 1 in the direction of the groove depth, for vertical type recording, or groove width, for lateral type recording, the type of deflection being predetermined for the recording of a signal, is referenced to the resulting depth $t'$ or the resulting width $b'$, respectively, shown in FIG. 2. These deflections are intended to produce small amplitude undulations with respect to the depth or width, respectively, of the groove created by the stylus 1. The stylus 8 is not, of course, deflected by the information signals, but remains at a position corresponding to the average position of stylus 1.

In order to be able to record a sufficiently large amplitude range, for example in the case of a sound recording, it is often advantageous to not record the sound signal directly, but in the form of a modulation of a carrier oscillation.

The amplitude of the recorded carrier oscillations should then advantageously not exceed 25% of the depth $t'$ or the width $b'$ of the groove cut by the stylus 1. When this requirement is met, a bridge 7 is created between adjacent grooves which is always of sufficient rigidity for guiding a pickup device during playback.

Figure 4:
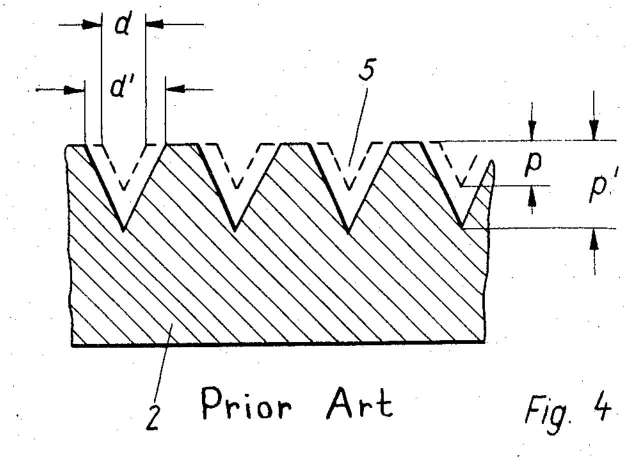
FIG. 4 is a pictorial, cross-sectional view used in explaining the cutting technique according to the prior art.
Figure 5:
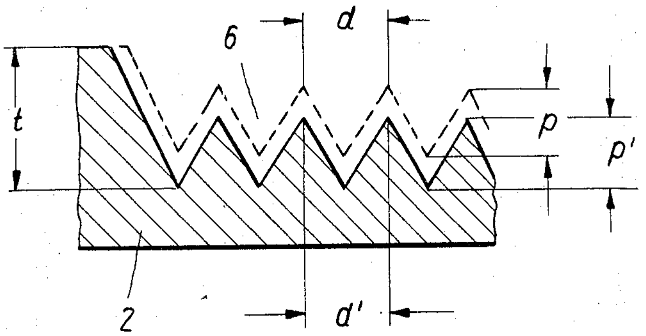
FIG. 5 is a view similar to that of FIG. 4 illustrating the principles of the present invention.

FIG. 4 shows the geometric relationships created by a groove-cutting procedure according to the prior art, which results in the formation of bridges which are flattened at the top so that portions of the original surface are thus retained. FIG. 5 shows, in a corresponding illustration, the corresponding relationships for the cutting method according to the present invention in which the groove-cutting force is increased to produce a groove depth $t$ which is such that no portions of the original surface of the disc remain.

In FIG. 4, the sides of the normally cut groove 5 having the desired depth are shown in cross section by solid lines. If the surface of the carrier 2 suddenly jumps away from the stylus tip, as a result of unevenness in its surface or due to a so-called "wobble," the height control of the cutting head mount can not respond quickly enough because of its large mass so that shallower, and narrower, grooves will be cut as indicated by the broken-line groove positions. If the normal grooves have the width $d'$ and the depth $p'$, and the grooves which were cut too shallow have the width $d$ and the depth $p$, the following relationship results:

$$d'/d=p'/p$$

The groove profiles therefore remain geometrically similar to each other.

FIG. 5 shows that with depth-cutting procedure according to the present invention the width $d'$ of the normal groove cut to a depth $t$ below the original surface of disc 2 will be equal to the width $d$ of a groove which is cut too shallow as a result of one of the above-mentioned occurrences. Accordingly, the groove depths $p'$ and $p$, measured vertically from the groove bottom to the groove crest, will also be equal. Thus, identical groove profiles result even if the cutting head can not accurately follow variations in the height of the disc surface because such profiles will always define the lines of intersection between adjacent grooves. Deviations occur only when the bottoms of two adjacent grooves are at markedly different levels, which practically never occurs.

It will be understood that the above description of the present invention is susceptible to various modifications, changes, and adaptations, and the same are intended to be comprehended within the meaning and range of equivalents of the appended claims.

I claim:

1. A method for cutting a spiral groove into the surface of a recording disc, which surface is not perfectly planar, by means of a cutting stylus having a triangular cross section defining two cutting edges forming between them an angle $\beta$ of predetermined magnitude, comprising rotating the disc relative to the stylus while applying to the stylus a sufficiently great cutting force to cause it to cut a groove whose average depth is such that none of the original surface of the disc will remain between adjacent turns of the spiral groove.

2. A method as defined in claim 1 wherein the adjacent turns of the groove cut by the stylus present an upwardly projecting, sharp crest therebetween, said method comprising the further step of cutting the top of such crest to leave a flat crest between adjacent grooves by means of a second cutting stylus having a flat cutting edge disposed parallel to the plane containing the bottoms of the groove turns adjacent the crest.

3. A method as defined in claim 2 wherein said step of cutting is carried out by removing a sufficient portion of each crest to cause the bottom of each groove turn adjacent such crest to have a predetermined depth below the resulting flat crest.

4. A method as defined in claim 1 comprising the further step of deflecting the cutting stylus in at least one direction normal to the length of the groove being cut in accordance with the signals to be recorded by an amount which is small in comparison with the maximum dimension of the groove parallel to the deflection direction.

5. A method as defined in claim 4 wherein said step of deflecting is carried out in response to a carrier signal which is modulated by the information to be recorded.

6. A method as defined in claim 5 wherein the deflection created by such carrier signal does not exceed 25% of the maximum groove dimension in the direction of such deflection.

7. A method as defined in claim 1 wherein the spiral groove has a constant pitch.

References Cited

UNITED STATES PATENTS

| | | | |
|---|---|---|---|
| 2,948,783 | 8/1960 | Scully | 274—41 X |
| 3,118,977 | 1/1964 | Olson. | |
| 3,312,475 | 4/1967 | Mazuranic | 274—42 X |
| 3,390,888 | 7/1968 | Klemp et al. | 274—46 |
| 3,420,967 | 1/1969 | Goldmark | 274—46 X |

JOHN F. CAMPBELL, Primary Examiner

V. A. DI PALMA, Assistant Examiner

U.S. Cl. X.R.

29—558; 274—41, 42